US010812825B2

(12) United States Patent
Liu et al.

(10) Patent No.: US 10,812,825 B2
(45) Date of Patent: Oct. 20, 2020

(54) VIDEO FRAME SYNTHESIS WITH DEEP LEARNING

(71) Applicant: Google LLC, Mountain View, CA (US)

(72) Inventors: Ziwei Liu, Shantin (HK); Yiming Liu, Seattle, WA (US); Aseem Agarwala, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/349,532

(22) PCT Filed: Sep. 29, 2017

(86) PCT No.: PCT/US2017/054460
§ 371 (c)(1),
(2) Date: May 13, 2019

(87) PCT Pub. No.: WO2018/089131
PCT Pub. Date: May 17, 2018

(65) Prior Publication Data
US 2019/0289321 A1    Sep. 19, 2019

Related U.S. Application Data

(60) Provisional application No. 62/421,709, filed on Nov. 14, 2016.

(51) Int. Cl.
*H04N 7/12* (2006.01)
*H04N 19/587* (2014.01)
(Continued)

(52) U.S. Cl.
CPC .......... *H04N 19/587* (2014.11); *G06N 3/088* (2013.01); *G06T 3/4046* (2013.01); *H04N 7/014* (2013.01); *H04N 19/89* (2014.11)

(58) Field of Classification Search
CPC ...... G06N 3/088; G06T 3/4046; H04N 7/014; H04N 19/587; H04N 19/89
See application file for complete search history.

(56) References Cited

U.S. PATENT DOCUMENTS

2016/0203263 A1* 7/2016 Maier .................. G06T 7/0016
                                                                                  705/2
2017/0186176 A1* 6/2017 Paluri ................. G06K 9/4628
(Continued)

OTHER PUBLICATIONS

Tran et al. ("Deep End2End Voxel2Voxel Prediction", Nov. 20, 2015 (Nov. 20, 2015), XP055355292, Retrieved from the Internet: URL: https://arxiv.org/pdf/1511.06681.pdf) (Year: 2015).*
(Continued)

*Primary Examiner* — Peet Dhillon
(74) *Attorney, Agent, or Firm* — Dority & Manning, PA

(57) ABSTRACT

The present disclosure provides systems and methods that leverage machine-learned models (e.g., neural networks) to provide video frame synthesis. In particular, the systems and methods of the present disclosure can include or otherwise leverage a machine-learned video frame synthesis model to allow for video frames to be synthesized from videos. In one particular example, the video frame synthesis model can include a convolutional neural network having a voxel flow layer and provides one or more synthesized video frames as part of slow-motion video.

20 Claims, 8 Drawing Sheets

(51) Int. Cl.
   *H04N 19/89*   (2014.01)
   *G06N 3/08*    (2006.01)
   *H04N 7/01*    (2006.01)
   *G06T 3/40*    (2006.01)

(56) References Cited

U.S. PATENT DOCUMENTS

2018/0082404 A1* 3/2018 Adsumilli .............. G06T 5/002
2019/0251360 A1* 8/2019 Cricri ................. G06K 9/00664

OTHER PUBLICATIONS

Baker et al., "A Database and Evaluation Methodology for Optical Flow", Institute of Electrical and Electronic Engineers International Conference on Computer Vision, Oct. 14-21, 2007, Rio de Janeiro, Brazil, 8 pages.
Dosovitskiy et al., "Flownet: Learning Optical Flow with Convolutional Networks", Institute of Electrical and Electronic Engineers International Conference on Computer Vision, Dec. 11-18, 2015, Araucano Park, Las Condes, Chili, pp. 2758-2766.
Finn et al., "Unsupervised Learning for Physical Interaction through Video Prediction", arXiv:1605.07157v4, Oct. 17, 2016, 12 pages.
Flynn et al., "DeepStereo: Learning to Predict New Views from the World's Imagery", Institute of Electrical and Electronic Engineers Conference on Computer Vision and Pattern Recognition, Jun. 26-Jul. 1, 2016, Las Vegas, Nevada, pp. 5515-5524.
Ganin et al., "Deepwarp: Photorealistic Image Resynthesis for Gaze Manipulation", arXiv:1607.07215v2, Jul. 26, 2016, 18 pages.
Goodfellow et al., "Generative Adversarial Nets", Conference on Neural Information Proceeding Systems, Dec. 8-13, 2014, Montreal, Canada, 9 pages.
Jaderberg et al., "Spatial Transformer Networks", Conference on Neural Information Proceeding Systems, Dec. 7-12, 2015, Montreal, Canada, 9 pages.
Krizhevsky et al., "ImageNet Classification with Deep Convolutional Neural Networks", Conference on Neural Information Proceeding Systems, Dec. 3-8, 2012, Lake Tahoe, Nevada, 9 pages.
Mahajan et al., "Moving Gradients: A Path-Based Method for Plausible Image Interpolation", AMC Transactions on Graphics, vol. 28, No. 3, Jul. 2009, 10 pages.
Mathieu et al., "Deep Multiscale Video Prediction Beyond Mean Square Error", arXiv:1511.05440v3, Nov. 23, 2015, 11 pages.
Meyer et al., "Phase-Based Frame Interpolation for Video", Institute of Electrical and Electronic Engineers Conference on Computer Vision and Pattern Recognition, Jun. 7-12, 2015, Boston, Massachusetts, pp. 1410-1418.
Revaud et al., "Epicflow: Edge-Preserving Interpolation of Correspondences for Optical Flow", Institute of Electrical and Electronic Engineers Conference on Computer Vision and Pattern Recognition, Jun. 7-12, 2015, Boston, Massachusetts, pp. 1164-1172.
Szeliski, "Prediction Error as a Quality Metric for Motion and Stereo", Institute of Electrical and Electronic Engineers International Conference on Computer Vision, Sep. 20-27, 1999, Kerkyra, Greece, 8 pages.
Vondrick et al., "Generating Videos with Scene Dynamics", Conference on Neural Information Processing Systems, Dec. 5-10, 2016, Barcelona, Spain, 9 pages.
Xie, et al., "Deep3D: Fully Automatic 2D-to-3D Video Conversion with Deep Convolutional Neural Networks", arXiv:1604.03650v1, Apr. 13, 2016, 15 pages.
Zhou et al., "View Synthesis by Appearance Flow", arXiv:1605.03557v2, Sep. 13, 2016, 16 pages.
Du Tran, et al. Deep End2End Voxel2Voxel Predictions, arXiv:1511.06681v1[cs.CV], Nov. 20, 2015, 9 pages.
Gucan Long, et al. "Learning Image Matching by Simply Watching Video", arXiv:1603.06041v2 [cs.CV] Mar. 29, 2016, 21 pages.
Nitish Srivastava, et al. "Unsupervised Learning of Video Representations using LSTMs", arXiv:1502.04681v3 [cs.LG] Jan. 4, 2016, 12 pages.
Mac Aurelio Ranzato, "Video (Langauge) Modeling: A Baseline for Generative Models of Natural Videos", arXiv:1412.6604v1 [cs.LG] Dec. 20, 2014, 15 pages.
International Search Report and Written Opinion received in PCT/US2017/054460, dated Dec. 20, 2017, 2 pages.

* cited by examiner

VIDEO FRAME SYNTHESIS WITH DEEP LEARNING

PRIORITY CLAIM

The present application is based upon and claims the right of priority under 35 U.S.C. § 371 to International Application No. PCT/US2017/054460, filed on Sep. 29, 2017, which claims the benefit of U.S. Provisional Application Ser. No. 62/421,709 filed Nov. 14, 2016. Applicant claims priority to and the benefit of each of such applications and incorporate all such applications herein by reference in its entirety.

FIELD

The present disclosure relates generally to video frame synthesis. More particularly, the present disclosure relates to video frame synthesis with deep learning.

BACKGROUND

Videos of natural scenes observe a complicated set of phenomena; objects deform and move quickly, occlude and disocclude each other, scene lighting changes, and cameras move. Parametric models of video appearance are often too simple to accurately model, interpolate, or extrapolate video. Nonetheless, video interpolation, i.e., synthesizing video frames between existing ones, is a common process in video and film production. A related problem is video extrapolation; predicting the future by synthesizing future video frames.

A traditional solution to these problems estimates optical flow between frames, and then interpolates or extrapolates along optical flow vectors. This approach works well when optical flow is accurate, but generates significant artifacts when it is not. A new approach uses generative convolutional neural networks (CNNs) to directly hallucinate RGB pixel values of synthesized video frames. While these techniques are promising, directly synthesizing RGB values is challenging, and the results are often blurry.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for video frame synthesis. The method includes receiving, by one or more computing devices, a video. The method includes inputting, by the one or more computing devices, a first set of sequential frame data descriptive of the video into a machine-learned video frame synthesis model. The machine-learned video frame synthesis model includes at least one convolutional neural network having a voxel flow layer. The method includes receiving, by the one or more computing devices, one or more synthesized frames from the video. The one or more synthesized frames are output by the machine-learned video frame synthesis model. The method includes providing, by the one or more computing devices, information regarding the one or more synthesized frames.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
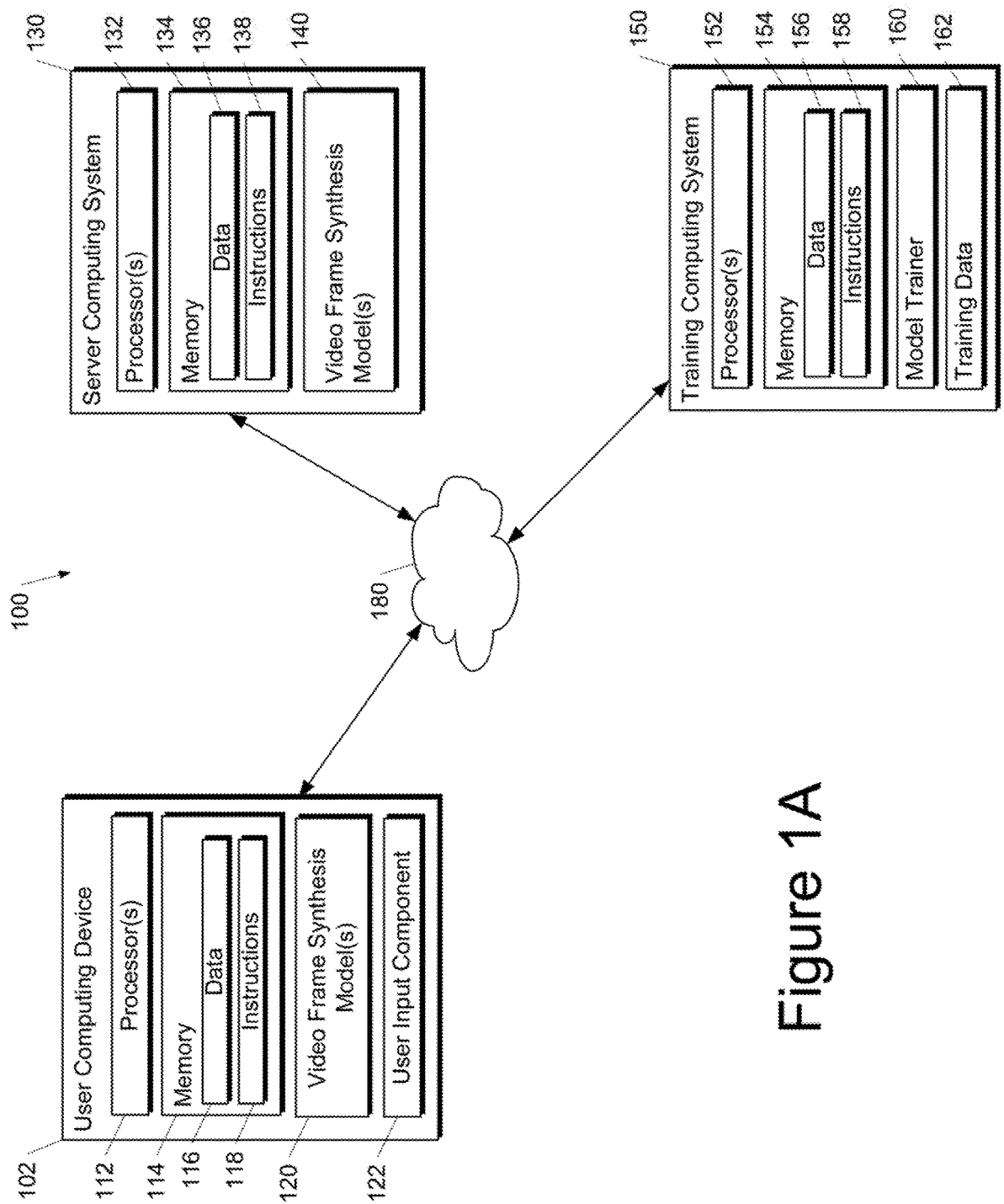
FIG. 1A depicts a block diagram of an example computing system that performs video frame synthesis according to example embodiments of the present disclosure.

Reference numerals that are repeated across plural figures are intended to identify the same features in various implementations.

DETAILED DESCRIPTION

Overview

The present disclosure provides systems and methods that leverage machine-learned models (e.g., neural networks) to provide video frame synthesis. In particular, the systems and methods of the present disclosure can include or otherwise leverage a machine-learned video frame synthesis model to allow for video frames to be synthesized from videos. For example, at least one in-between synthetic frame can be interpolated from at least two existing frames of an input video and/or at least one subsequent synthetic frame can be extrapolated from the at least two existing frames of the input video.

According to an aspect of the present disclosure, in some implementations, the video frame synthesis model can include a convolutional neural network that has a voxel flow layer. For example, the convolutional neural network can be a convolutional encoder-decoder. In some implementations, the voxel flow layer can describe a per-pixel three-dimensional optical flow vector across both space and time in the input video. The video frame synthesis model can synthesize one or more synthesized video frames based on the voxel flow and one or more existing frames from the input video.

In one example application, the newly synthesized frames can be used to form at least a portion of a video that depicts a scene in slow motion.

More particularly, the present disclosure describes a deep voxel flow (DVF) network. The DVF network can be an end-to-end fully differentiable network that can be used, for example, to perform video frame synthesis. In certain implementations, the only training data required are triplets of consecutive video frames in which two frames are provided as inputs and the rest frame is used as a reconstruction target. Thus, the systems and methods of the present disclosure can use existing videos to train CNNs in an unsupervised fashion. For example, in certain implementations, frames can be dropped from existing videos, and a loss function can be employed that measures similarity between generated pixels and ground-truth dropped frames.

According to another aspect, the systems and methods described herein are self-supervised and can learn to reconstruct frames by borrowing voxels from neighboring frames. In this manner, the output results can be both realistic and sharp and no pre-registration is needed for the input videos. As further technical benefits, ground truth optical flow is not needed as supervision and, due to the flexible motion modeling described herein, no pre-registration is required for the input videos.

In particular, in some implementations, pixels can be generated by interpolating pixel values from nearby frames. As one example, a video frame synthesis model can include a convolutional neural network that includes a voxel flow layer. For example, the voxel flow layer can be a per-pixel, 3D optical flow vector across space and time in the input video.

In some implementations, the final pixel can be generated by trilinear interpolation across the input video volume (which can typically be just two frames). Thus, for video interpolation, the final output pixel can be a blend of pixels from the previous and next frames. Such a voxel flow layer can be, in some respects, similar to an optical flow field. However, the voxel flow layer is only an intermediate layer, and, in some implementations, its correctness is never directly evaluated. Thus, the systems and methods of the present disclosure do not require optical flow supervision.

Thus, aspects of the present disclosure address the problem of synthesizing new video frames in an existing video, either in-between existing frames (interpolation), or subsequent to them (extrapolation). In particular, the systems and methods of the present disclosure can include a deep network that learns to synthesize video frames by flowing pixel values from existing ones, which is referred to herein as deep voxel flow. The frame synthesis methods require no human supervision, and any existing video can be used as training data by dropping, and then learning to predict, existing frames. The techniques described herein are efficient, and can be applied at any video resolution.

As one example, the systems and methods of the present disclosure can be included or otherwise employed within the context of an application, a browser plug-in, an operating system, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service.

With reference now to the Figures, example embodiments of the present disclosure will be discussed in further detail.

Example Devices and Systems

FIG. 1A depicts a block diagram of an example computing system 100 that performs video frame synthesis according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more video frame synthesis models 120. For example, the video frame synthesis models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Example video frame synthesis models 120 are discussed with reference to FIGS. 2-4.

In some implementations, the one or more video frame synthesis models 120 can be received from the server computing system 130 over network 180, stored in the user computing device memory 114, and the used or otherwise implemented by the one or more processors 112. In some implementations, the user computing device 102 can implement multiple parallel instances of a single video frame synthesis model 120.

Figure 2:
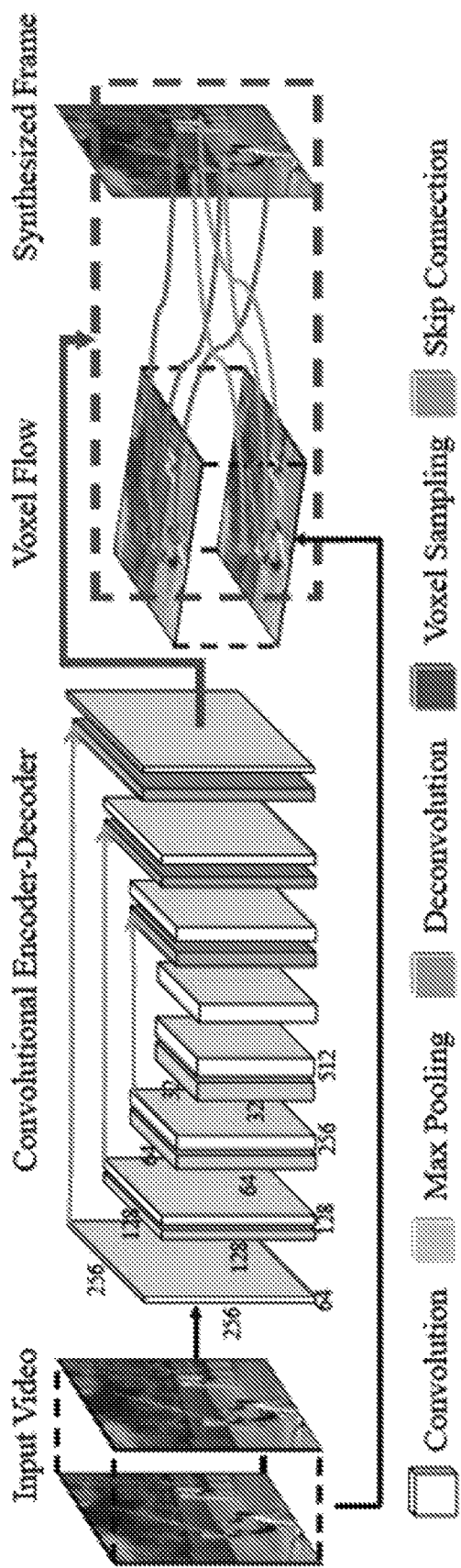
FIG. 2 depicts a diagram of an example video frame synthesis model according to example embodiments of the present disclosure.

More particularly FIG. 2 illustrates an example pipeline of DVF in accordance with certain aspects of the present disclosure, where a convolutional encoder-decoder predicts the 3D voxel flow, and then a volume sampling layer synthesizes the desired frame, accordingly. Specifically, the convolutional encoder-decoder is denoted as H(X; Θ), where X is the input video and Θ are the network parameters. The output of H is a 3D voxel flow field F on a pre-defined grid G:

$$F=(\Delta x_i^s, \Delta y_i^s, \Delta t_i^s)_G = H(X;\Theta) \qquad (1)$$

Then, the original input video X is warped according to F to get the final synthesized frame $\hat{Y}$:

$$\hat{Y}=T_{x,y,t}(X,F)=T_{x,y,t}(X,H(X;\Theta)) \qquad (2)$$

where $T_{x,y,t}$ is the volume sampling function operating on spatio-temporal coordinates (x,y,t). As illustrated in FIG. 2, DVF learns to synthesize target frame $Y \in R^{H \times W}$ from the input video $X \in R^{H \times W \times L}$, where H, W, L are the height, width and frame number of the input video. The target frame Y can be the in-between frame (interpolation), or the next frame (prediction) of the input video. DVF can adopt a fully-convolutional encoder-decoder architecture, which can contain five convolution layers and three deconvolution layers. Therefore, arbitrary-sized videos can be used as inputs for DVF. The network hyperparamters (e.g., the size of feature maps and the number of channels) are specified in FIG. 2.

For the encoder section of the network, each processing unit can contain both convolution and max-pooling. In certain aspects of the present disclosure, the convolution kernel sizes are 5×5, 5×5, 3×3, 3×3, respectively. The bottleneck layer is also connected by convolution with kernel size 3×3. For the decoder section, each processing unit can contains bilinear upsampling and convolution. In certain aspects of the present disclosure, the convolution kernel sizes are 3×3, 3×3, 5×5, 5×5, respectively. Skip connections can be added to better maintain spatial information between the corresponding convolution and deconvolution layers. Specifically, the corresponding deconvolution layers and convolution layers can be concatenated together before being fed forward.

The convolutional encoder-decoder can output 3D voxel flow field $F=(\Delta x_i^s, \Delta y_i^s, \Delta t_i^s)_G$ on grid $G=(x_i^G, y_i^G, t_i^G)$. In certain implementations, offset coordinates can be utilized instead of absolute coordinates to define voxel flow because offsets can be more normalized and easier to learn. This 3D voxel flow generates each target voxel $(x_i, y_i, t_i)$ by copying from source voxel $(x_i^s, y_i^s, t_i^s)$:

$$\hat{Y}(x_i, y_i, t_i) = X(x_i^s, y_i^s, t_i^s)$$

$$x_i^s = x_i^G + \Delta x_i^s$$

$$y_i^s = y_i^G + \Delta y_i^s$$

$$t_i^s = t_i^G + \Delta t_i^s \quad (3)$$

Figure 3:
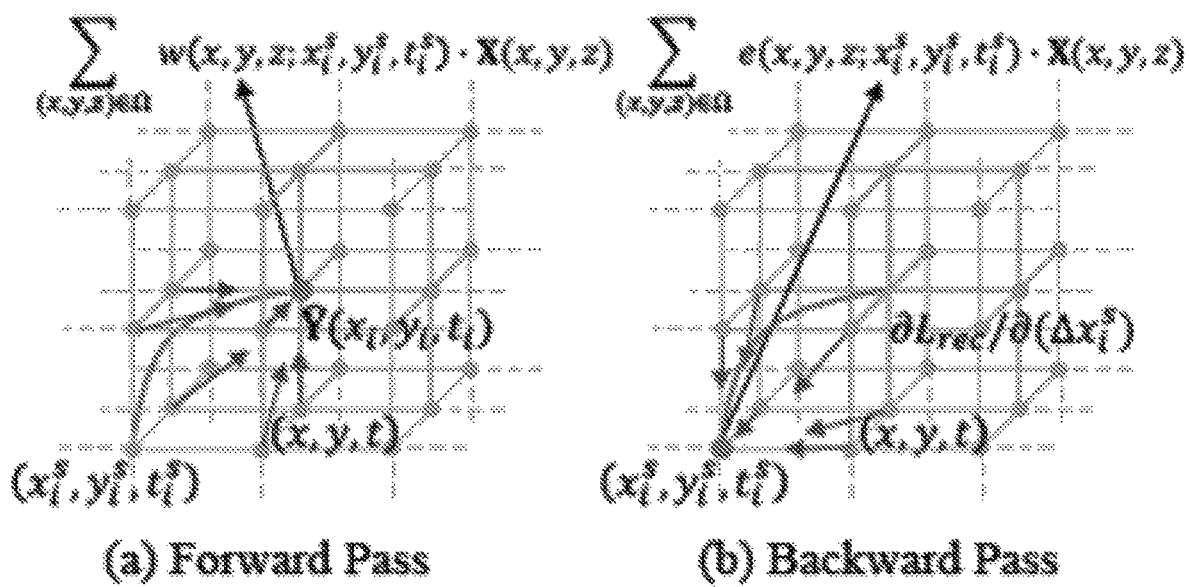
FIG. 3 depicts a forward and backward pass of a voxel flow according to example embodiments of the present disclosure.

However, due to occlusions and the ambiguity between different flows, not all target voxels will have a source voxel projected onto them by the predicted 3D voxel flow. Trilinear interpolation can be utilized to avoid holes and other unpleasant artifacts, which can be formulated as a volume sampling mechanism:

$$\hat{Y}(x_i, y_i, t_i) = \sum_{(x,y,t)\in\Omega} w(x, y, t; x_i^s, y_i^s, t_i^s) \cdot X(x, y, t) = \sum_{(x,y,t)\in\Omega} X(x, y, t) \cdot \max(0, 1-|x_i^s-x|) \cdot \max(0, 1-|y_i^s-y|) \cdot \max(0, 1-|t_i^s-t|) \quad (4)$$

where $X(x,y,t)$ is the voxel value at location $(x,y,z)$ of the input, and $\hat{Y}(x_i, y_i, t_i)$ is the output value for voxel $i\in[1,\ldots,H\times W]$ at location $(x_i, y_i, t_i)$. $\Omega$ is the neighboring cube of the projected source voxel $(x_i^s, y_i^s, t_i^s)$ and $w(x,y,t; x_i^s, y_i^s, t_i^s)$ is the trilinear resampling weight. Because of the existence of truncation function $\max(0, 1-|x_i^s-x|)$, the target voxel $\hat{Y}(x_i, y_i, t_i)$ is actually the weighted average of neighboring cube of the projected source voxel $X(x_i^s, y_i^s, t_i^s)$, which is depicted in FIG. 3.

This 3D voxel flow can be understood as the joint modeling of 2D motion field and selection mask. It can be achieved by projecting F into $F_{motion}=(\Delta x_i^s, \Delta y_i^s)_G$ and $F_{selection}=(\Delta t_i^s)_G$. And $F_{motion}$ can be further categorized into $F_{forward}$ and $F_{backward}$ depending on the t of interest.

For DVF training, rather than adopting the $l_2$ loss function as, the $l_1$ loss with spatial and temporal coherence regularizations can be exploited to reduce visual artifacts. The total variation (TV) regularization can be adopted for enforcing spatial coherence and the forward-backward flow consistency is adopted for enforcing temporal coherence. Moreover, these regularizers, which are imposed on the output of the network, can be incorporated into the back-propagation scheme. This can be formalized as minimizing the following objective function:

$$\min L = \frac{1}{N} \sum_{\langle X,Y\rangle \in D} (PY - T_{x,y,t}(X, F)P_1 + \lambda_1 P\nabla F P_1 + \lambda_2 P F_{forward} - F_{backward} P_1) \quad (5)$$

where D is the training set of all frame triplets, N is its cardinality and Y is the target frame to be reconstructed. $PVFP_1$ is the aforementioned total variation term and $\lambda_1$ is the corresponding regularization weight. $PF_{forward}-F_{backward}P_1$ is the forward-backward flow consistency term and $\lambda_2$ is the corresponding regularization weight. It generally states that the motion should be steady when tracing the interpolated frame to both source frames bi-directionally. To deal with the $l_1$ norm, the Charbonnier penalty function $\Phi(x)=(x^2+\epsilon^2)^{1/2}$ can be utilized for approximation. Here, the following can be empirically set: $\lambda_1=0.01$, $\lambda_1=0.005$ and $\epsilon=0.001$. Learning the network can be achieved via a gradient-based optimization method solver (e.g. ADAM solver) with learning rate of 0.0001, $\beta_1=0.9$, $\beta_2=0.999$ and batch size of 32. Though a TV regularizer is described herein, a more sophisticated edge-aware regularizer, such as fast bilateral solver, could also be utilized in connection with the present framework.

In order for the DVF to be an end-to-end fully differentiable system, the gradients can be defined with respect to 3D voxel flow $F=(\Delta x_i^s, \Delta y_i^s, \Delta t_i^s)_G$ so that the reconstruction error can be backpropagated through volume sampling layer. The partial derivative of reconstruction loss $L_{rec}=PY(x_i,y_i,t_i)-\hat{Y}(x_i,y_i,t_i)P_1$ $\Delta x_i^s$ is:

$$\frac{\partial L_{rec}}{\partial(\Delta x_i^s)} = \frac{\partial \hat{Y}(x_i, y_i, t_i)}{\partial(\Delta x_i^s)} = \frac{\partial \hat{Y}(x_i, y_i, t_i)}{\partial x_i^s} = \sum_{(x,y,t)\in\Omega} e_{x_i^s}(x, y, t; x_i^s, y_i^s, t_i^s) \cdot X(x, y, t) = \max(0, 1-|y_i^s-y|) \cdot \max(0, 1-|t_i^s-t|) \cdot X(x, y, t) \cdot \begin{cases} 0 & \text{if } |x-x_i^s| \geq 1 \\ 1 & \text{if } x \geq x_i^s \\ -1 & \text{if } x < x_i^s \end{cases} \quad (6)$$

where $\Omega$ is the neighboring cube of the projected source voxel $(x_i^s, y_i^s, t_i^s)$ and $e_{x_i^s}(x,y,t;x_i^s,y_i^s,t_i^s)$ is the error reassignment weight $x_i^s$. Similarly, $\partial L_{rec}/\partial(\Delta y_i^s)$ and $\partial L_{rec}/\partial(\Delta t_i^s)$ can be obtained. This can provide a sub-differentiable sampling mechanism, allowing loss gradients to flow back to the 3D voxel flow F. Such a sampling mechanism can be implemented very efficiently on GPU, by ignoring the sum over all input locations and instead just looking at the kernel support region for each output voxel, which is depicted in FIG. 3.

As described herein, the gradients of reconstruction error can be obtained by only looking at the kernel support region for each output voxel. To handle large motion in videos, more long-range correspondences can be learned by our model. Therefore, in certain aspects of the present disclosure, multi-scale Deep Voxel Flow (multi-scale DVF) can be utilized so that both large motion and small motion can be encoded.

Specifically, a series of convolutional encoder-decoder $H_N, H_{N-1}, \ldots, H_0$ can work on video frames from coarse scale $s_N$ to fine scale $s_0$, respectively. In certain implementations, set $s_N=32\times32$, $s_{N-1}=64\times64$, ..., $s_0=256\times256$. In each scale k, the sub-network $H_k$ predicts 3D voxel flow $F_k$ at that resolution. Large motion can have a relatively small offset vector $F_k=(\Delta x_i^s, \Delta y_i^s, \Delta t_i^s)_{G_k}$ in coarse scale $s_N$. Thus, the sub-networks $H_N, \ldots, H_1$ in coarser scales $s_N, \ldots, s_1$ are capable to produce desired multi-scale voxel flows $F_N, \ldots, F_1$ even for large motions.

Figure 4:
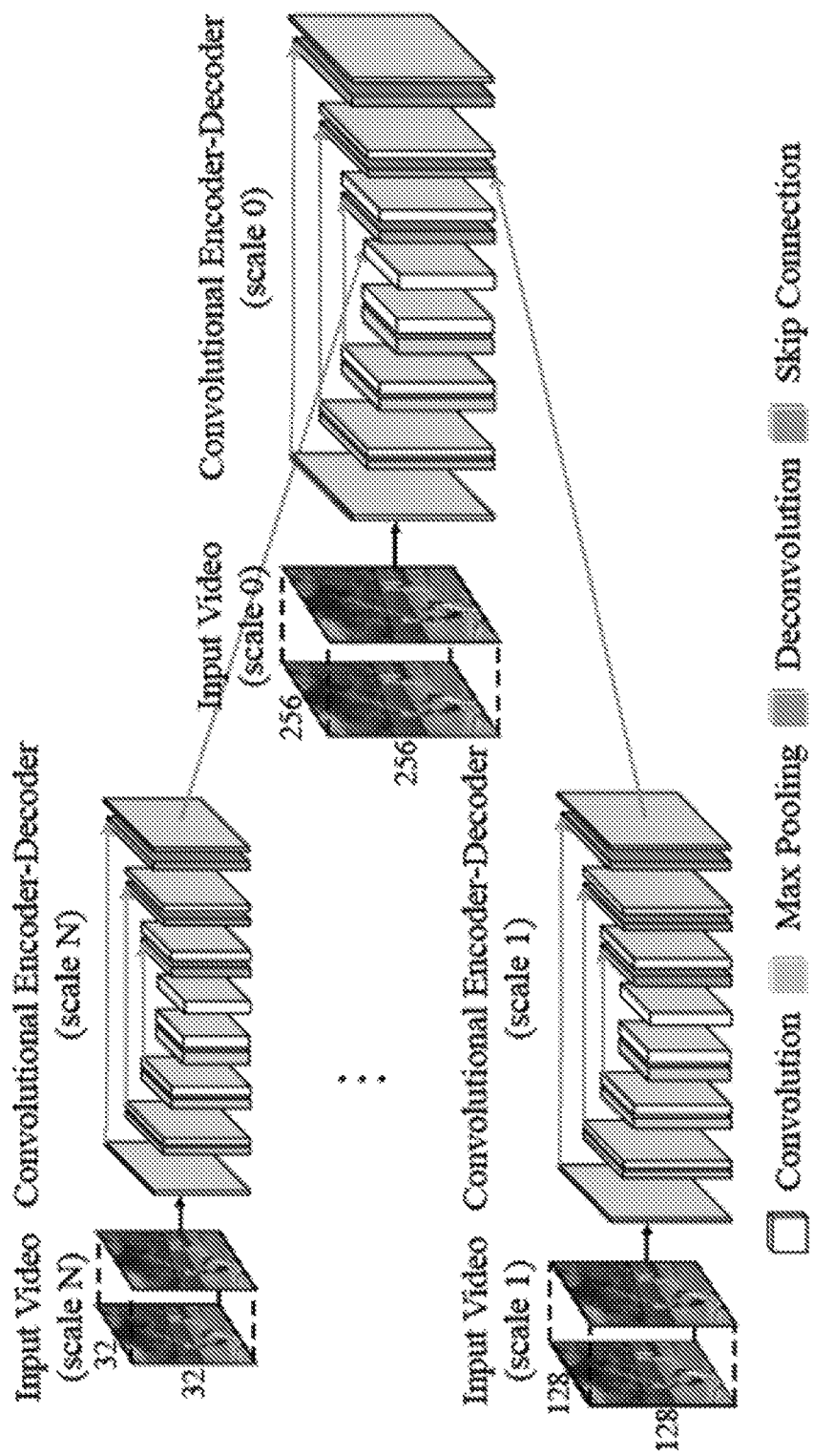
FIG. 4 depicts a diagram of an example video frame synthesis model according to example embodiments of the present disclosure.

Such multi-scale voxel flows can be fused to the finest network $H_0$ to achieve a final result. The fusion can be conducted by concatenating multi-scale voxel flow $F_k$ to its corresponding decoder layer, which has the same spatial resolution $s_k$. The network architecture of multi-scale DVF is illustrated in FIG. 4 and can be formulated as:

$$\hat{Y}_0 = T(X, F_0) = T(X, H(X; \Theta, F_N, \ldots, F_1)) \qquad (7)$$

Since each sub-network $H_k$ is fully differentiable, the multi-scale DVF can also be trained end-to-end with reconstruction loss $PY_k - T(X_k, F_k)P_1$ for each scale $s_k$.

The framework described herein can be extended to multi-step prediction in either interpolation or extrapolation. For example, if the goal is to predict the next D frames when given the current L frames, the target Y becomes a 3D volume ($Y \in R^{H \times W \times D}$) instead of a 2D frame ($Y \in R^{H \times W}$). Similar to Eqn.4 described herein, each output voxel $\hat{Y}=(x_i, y_i, t_i)$, $i \in [1, \ldots, H \times W \times D]$ can be obtained by performing trilinear interpolation on the input video X. The spatio-temporal structure of Y can be well modeled because 3D voxel flow $F=(\Delta x_i^s, \Delta y_i^s, \Delta t_i^s)_G$, $i \in [1, \ldots, H \times W \times D]$ is predicted via convolution such that local correlations are maintained.

Additionally or alternatively, one or more video frame synthesis models 140 can be included in or otherwise stored and implemented by the server computing system 130 that communicates with the user computing device 102 according to a client-server relationship. For example, the video frame synthesis models 140 can be implemented by the server computing system 140 as a portion of a web service (e.g., a video editing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned video frame synthesis models 140. For example, the video frame synthesis models 140 can be or can otherwise include various machine-learned models such as neural networks (e.g., deep recurrent neural networks) or other multi-layer non-linear models. Example video frame synthesis models 140 are discussed with reference to FIGS. 2-4.

The server computing system 130 can train the communication assistance models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a video frame synthesis model 140 based on a set of training data 142. The training data 142 can include, for example, the public UCF-101 dataset.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the video frame synthesis models 120 can be both trained and used locally at the user computing device 102. In some of such implementations, the user computing device 102 can implement the model trainer 160 to personalize the video frame synthesis models 120 based on user-specific data.

Figure 1B:
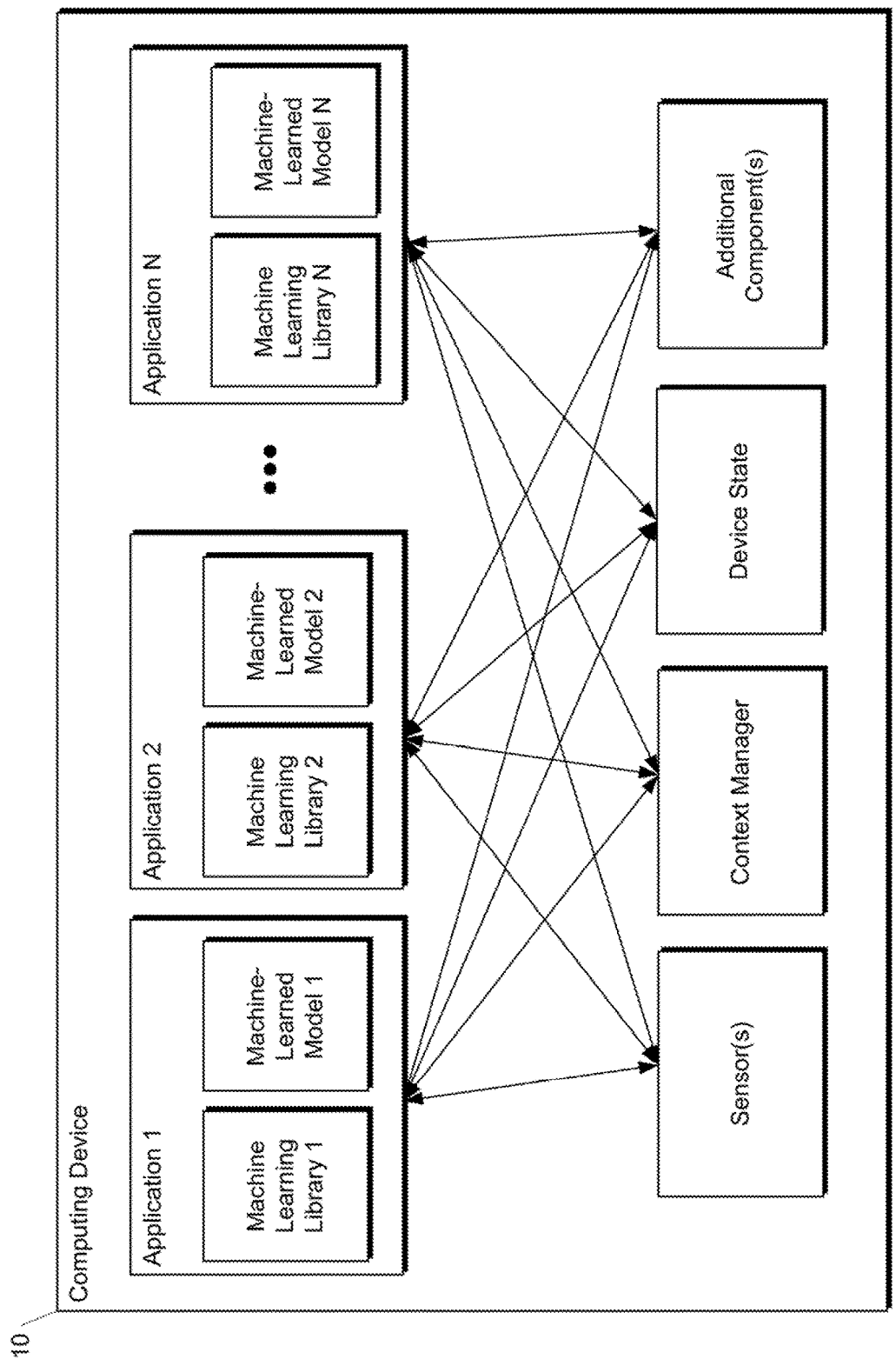
FIG. 1B depicts a block diagram of an example computing device that performs video frame synthesis according to example embodiments of the present disclosure.

FIG. 1B depicts a block diagram of an example computing device 10 that performs video editing according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned communication assistance model. An example application includes a video editing application.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
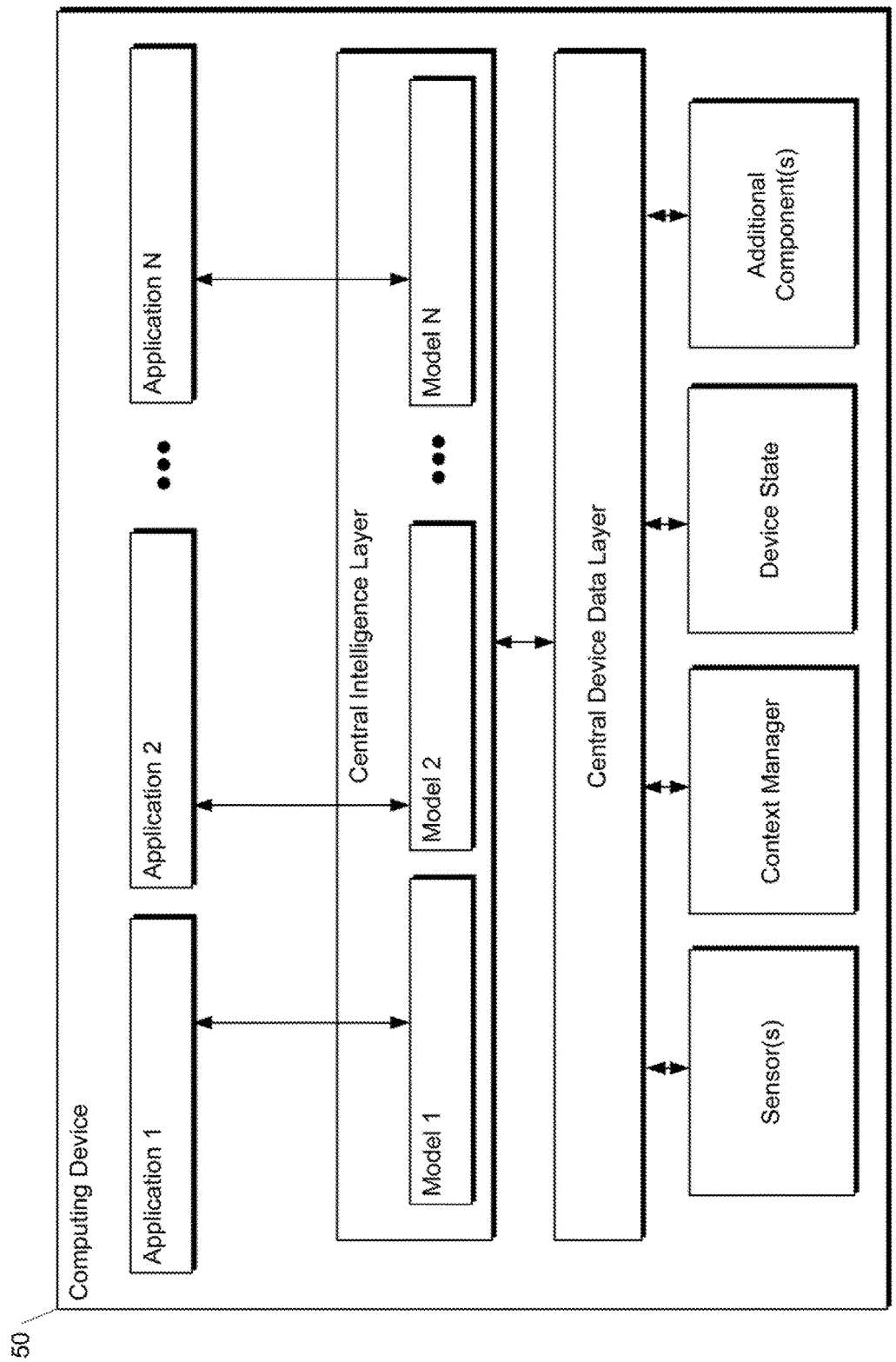
FIG. 1C depicts a block diagram of an example computing device that performs video frame synthesis according to example embodiments of the present disclosure.

FIG. 1C depicts a block diagram of an example computing device 50 that performs communication assistance according to example embodiments of the present disclosure. The computing device 50 can be a user computing device or a server computing device.

The computing device 50 includes a number of applications (e.g., applications 1 through N). Each application is in communication with a central intelligence layer. An example application includes a video editing application. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a video frame synthesis model) can be provided for each application and managed by the central intelligence layer. In other implementations, two or more applications can share a single machine-learned model. For example, in some implementations, the central intelligence layer can provide a single model (e.g., a single communication assistance model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 5:
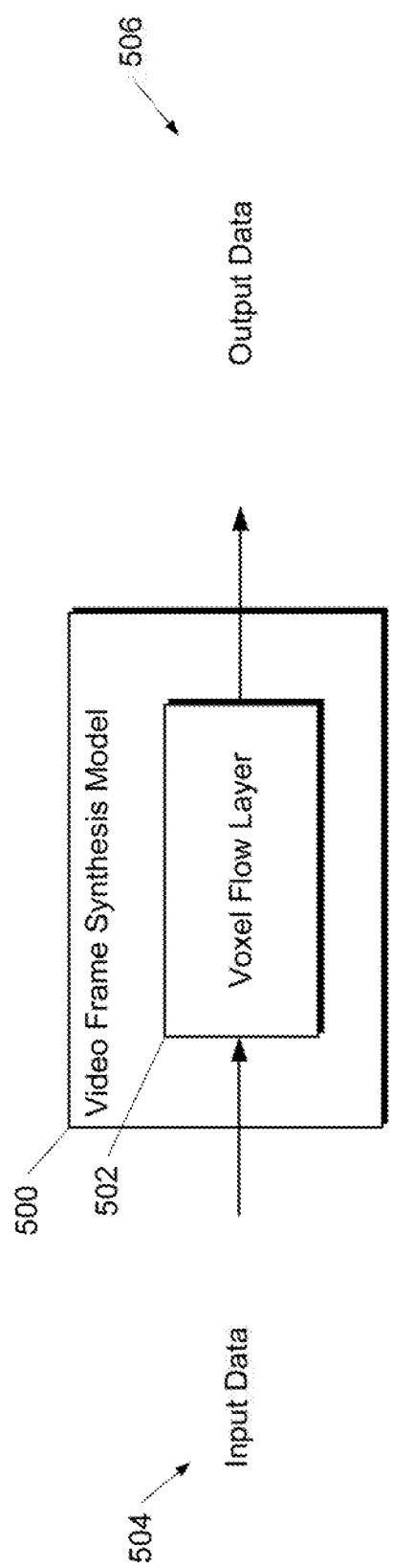
FIG. 5 depicts a block diagram of an example video frame synthesis model according to example embodiments of the present disclosure.

FIG. 5 depicts a block diagram of an example video frame synthesis model 500 according to example embodiments of the present disclosure. In some implementations, the video frame synthesis model 500 is trained to receive a set of input data 504 descriptive of a videos and, as a result of receipt of the input data 504, provide output data 506 that describes synthesized target frames of the input video. Thus, in some implementations, the video frame synthesis model 500 can include a voxel flow layer 502 that is operable to describe a per-pixel three-dimensional optical flow vector across both space and time in the input video. The video frame synthesis model 500 can synthesize the one or more synthesized video frames 506 based on the voxel flow and one or more existing frames from the input data 504.

Example Methods

Figure 6:
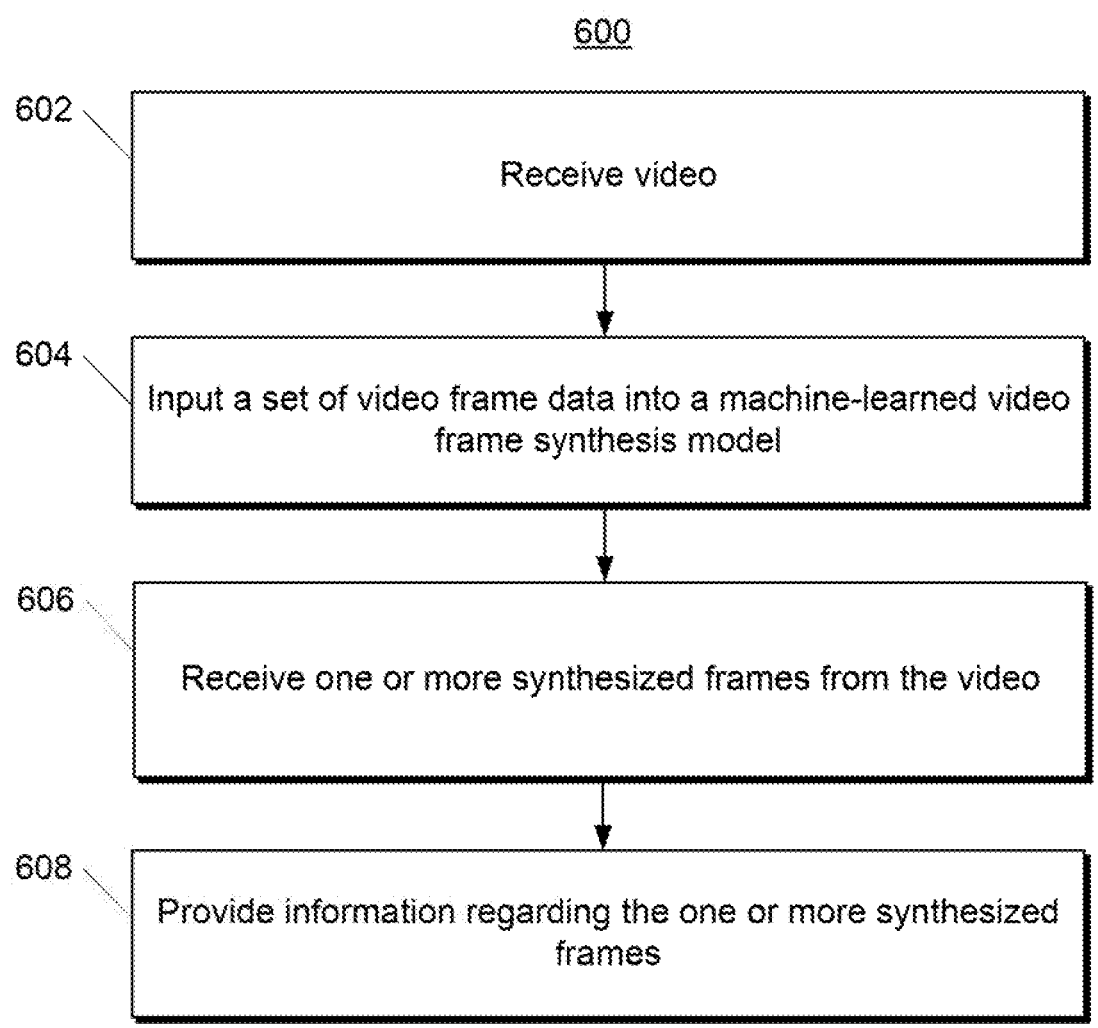
FIG. 6 depicts a flow chart diagram of an example method to perform video frame synthesis according to example embodiments of the present disclosure.

FIG. 6 depicts a flow chart diagram of an example method to perform communication assistance according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system receives a video, such as a video provided by a user. As examples, the communication can be loaded into a user computing device via another device (e.g., video camera, storage device, etc.) or can be captured by a camera or video camera connected to the user computing device.

At 604, the computing system inputs a set of video frame data into a machine-learned video frame synthesis model. For example, a user computing device can input the video frame data into a local machine-learned video frame synthesis model. As another alternative example, a user computing device can transmit the set of video frame data over a network to a server computing device and the server computing device can input the set of communication data into a machine-learned video frame synthesis model stored at the server computing device.

At 606, the computing system receives one or more synthesized frames from the video. The one or more synthesized frames can have been output by the machine-learned video frame synthesis model. For example, the user computing device can receive the synthesized frames from a local model or from the server over the network.

At 608, the computing system provides information regarding the one or more synthesized frames. For example, the information can be provided for display to a user.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for video frame synthesis, the method comprising:
   receiving, by one or more computing devices, a video;
   inputting, by the one or more computing devices, a first set of sequential frame data descriptive of the video into a machine-learned video frame synthesis model, wherein the machine-learned video frame synthesis model comprises at least one convolutional neural network having a voxel flow layer, the at least one convolutional neural network is at least partially trained using unsupervised learning to predict a voxel flow field comprising a per-pixel, 3D optical flow vector across space and time;
   receiving, by the one or more computing devices, one or more synthesized frames from the video, the one or more synthesized frames output by the machine-learned video frame synthesis model; and
   providing, by the one or more computing devices, information regarding the one or more synthesized frames.

2. The computer-implemented method of claim 1, wherein:
   the at least one convolutional neural network comprises a convolutional encoder-decoder network.

3. The computer-implemented method of claim 2, wherein the convolutional encoder-decoder network includes at least one skip connection between at least one convolution layer and at least one deconvolution layer.

4. The computer-implemented method of claim 1, further comprising:
   providing, by the one or more computing devices, information regarding the one or more synthesized frames as part of a slow-motion video.

5. The computer-implemented method of claim 1, wherein at least one of the one or more synthesized frames output by the machine-learned video frame synthesis model comprises an interpolated frame in-between the first set of sequential frame data.

6. The computer-implemented method of claim 1, wherein at least one of the one or more synthesized frames output by the machine-learned video frame synthesis model comprises a predicted frame after the first set of sequential frame data.

7. The computer-implemented method of claim 1, further comprising providing, by the one or more computing devices, a modified video that includes an interpolated frame.

8. A computing system for video frame synthesis, the computing system comprising:
   at least one processor;
   a machine-learned video frame synthesis model that comprises at least one convolutional neural network having a voxel flow layer, wherein the video frame synthesis model is trained to receive a first set of sequential frame data descriptive of a video and, in response to receipt of the first set of sequential frame data, determine one or more synthesized frames from the video, the at least one convolutional neural network is at least partially trained using unsupervised learning to predict a voxel flow field comprising a per-pixel, 3D optical flow vector across space and time; and
   at least one tangible, non-transitory computer-readable medium that stores instructions that, when executed by the at least one processor, cause the at least one processor to:
      obtain the first set of sequential frame data descriptive of the video;
      input the first set of sequential frames into the video frame synthesis model; and
      receive, as an output of the video frame synthesis model, the one or more synthesized frames.

9. The computing system of claim 8, wherein the video comprises a high definition video.

10. The computing system of claim 8, wherein at least one of the one or more synthesized frames output by the machine-learned video frame synthesis model comprises an interpolated frame in-between the first set of sequential frame data.

11. The computing system of claim 8, wherein at least one of the one or more synthesized frames output by the machine-learned video frame synthesis model comprises a predicted frame after the first set of sequential frame data.

12. The computing system of claim 8, wherein the at least one convolutional neural network comprises an intermediate layer in the machine-learned video frame synthesis model.

13. A user computing device, the user computing device comprising:
   at least one processor; and
   at least one non-transitory computer-readable medium that stores instructions that, when executed by the at least one processor, cause the user computing device to:
      receive a video;
      input a first set of sequential frame data descriptive of the video into a machine-learned video frame synthesis model, wherein the machine-learned video frame synthesis model comprises at least one convolutional neural network having a voxel flow layer, the at least one convolutional neural network is at least partially trained using unsupervised learning to predict a voxel flow field comprising a per-pixel, 3D optical flow vector across space and time;

receive one or more synthesized frames from the video, the one or more synthesized frames output by the machine-learned video frame synthesis model; and display information regarding the one or more synthesized frames.

14. The computer-readable medium of a claim 13, further configured to store the machine-learned video frame synthesis model.

15. The computer-readable medium of a claim 13, wherein the execution of the instructions further causes the at least one processor to:

provide the synthesized frames as part of a slow-motion video.

16. The computer-implemented method of claim 2, wherein:

the convolution encoder-decoder network is trained to predict the voxel flow field comprising the per-pixel, 3D optical flow vector across space and time;

the one or more synthesized frames are output by the machine-learned video frame synthesis model based on the first set of sequential frames and the predicted voxel flow field by sampling the voxel flow field;

the convolutional neural network is trained in an unsupervised fashion by:

removing one or more frames from the received video;

providing a plurality of the remaining frames as the first set of sequential frames;

generating the one or more synthesized frames to correspond to the one or more removed frames;

calculating a loss function to represent a similarity between the one or more synthesized frames and the one or more removed frames; and adjusting one or more parameters of the convolutional neural network in order to minimize the calculated loss function.

17. The computer-implemented method of claim 16, wherein:

the one or more synthesized frames are generated by the machine-learned video frame synthesis model based on the first set of sequential frames and the predicted voxel flow field by warping one or more frames of the received video according to the predicted voxel flow field.

18. The computer-implemented method of claim 17, wherein:

the machine-learned video frame synthesis model warps the one or more frames of the received video using a volume sampling function operating on spatio-temporal coordinates.

19. The computer-implemented method of claim 18, wherein the machine-learned video frame synthesis model includes:

one or more convolution layers and one or more deconvolution layers; and one or more network hyperparameters specifying a size of one or more feature maps and a number of channels.

20. The computing system of claim 8, wherein:

the at least one convolutional neural network comprises a convolutional encoder-decoder network;

the convolution encoder-decoder network is trained to predict the voxel flow field comprising the per-pixel, 3D optical flow vector across space and time;

the one or more synthesized frames are output by the machine-learned video frame synthesis model based on the first set of sequential frames and the predicted voxel flow field by sampling the voxel flow field;

the convolutional neural network is trained in an unsupervised fashion by:

providing a plurality of the remaining frames as the first set of sequential frames;

generating the one or more synthesized frames to correspond to the one or more removed frames;

calculating a loss function to represent a similarity between the one or more synthesized frames and the one or more removed frames; and adjusting one or more parameters of the convolutional neural network in order to minimize the calculated loss function.

* * * * *